(12) United States Patent
Grant et al.

(10) Patent No.: US 7,779,166 B2
(45) Date of Patent: Aug. 17, 2010

(54) USING HAPTIC EFFECTS TO ENHANCE INFORMATION CONTENT IN COMMUNICATIONS

(75) Inventors: Danny A. Grant, Montreal (CA); Jeffrey Eid, Danville, CA (US); Shoichi Endo, Cupertino, CA (US); Erik J. Shahoian, San Ramon, CA (US); Dean C. Chang, Gaithersburg, MD (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 10/538,162

(22) PCT Filed: Dec. 8, 2003

(86) PCT No.: PCT/US03/38868
§ 371 (c)(1),
(2), (4) Date: Jun. 13, 2006

(87) PCT Pub. No.: WO2004/053644
PCT Pub. Date: Jun. 24, 2004

(65) Prior Publication Data
US 2007/0005835 A1 Jan. 4, 2007

Related U.S. Application Data

(60) Provisional application No. 60/431,662, filed on Dec. 8, 2002.

(51) Int. Cl.
*G06F 3/00* (2006.01)
(52) U.S. Cl. .......................... 710/5; 715/700; 715/701; 715/702

(58) Field of Classification Search .................. None
See application file for complete search history.

(56) References Cited

U.S. PATENT DOCUMENTS

| | | | |
|---|---|---|---|
| 4,771,344 | A | 9/1988 | Fallacaro et al. |
| 4,851,820 | A | 7/1989 | Fernandez |
| 5,172,092 | A | 12/1992 | Nguyen et al. |
| 5,575,761 | A | 11/1996 | Hajianpour |

(Continued)

FOREIGN PATENT DOCUMENTS

JP  11-299305  2/1999

(Continued)

OTHER PUBLICATIONS

Search Report, International Searching Authority, PCT/US03/38862, Apr. 12, 2004.

(Continued)

*Primary Examiner*—Eron J Sorrell
(74) *Attorney, Agent, or Firm*—Womble Carlyle Sandridge & Rice, PLLC

(57) ABSTRACT

Embodiments of the invention relate to methods and systems for providing customized "haptic messaging" to users of handheld communication devices in a variety of applications. In one embodiment, businesses and organizations may each be associated with a distinct haptic logo and include their haptic logos in various messages sent to the handheld communication devices of their customers. In another embodiment, haptically-enabled avatars can be used in a chat session between users of handheld communication devices.

18 Claims, 9 Drawing Sheets

U.S. PATENT DOCUMENTS

| | | |
|---|---|---|
| 5,719,561 A | 2/1998 | Gonzales |
| 5,732,347 A | 3/1998 | Bartle et al. |
| 5,734,373 A | 3/1998 | Rosenberg et al. .......... 345/161 |
| 5,791,992 A | 8/1998 | Crump et al. |
| 5,805,601 A | 9/1998 | Takeda et al. |
| 5,832,386 A | 11/1998 | Nojima et al. |
| 5,884,029 A | 3/1999 | Brush, II et al. |
| 5,907,615 A | 5/1999 | Kaschke .................... 379/433 |
| 5,917,906 A | 6/1999 | Thornton .................... 379/433 |
| 5,953,413 A | 9/1999 | Peyer et al. |
| 5,956,484 A | 9/1999 | Rosenberg et al. |
| 5,999,168 A | 12/1999 | Rosenberg et al. |
| 6,018,711 A | 1/2000 | French-St. George et al. .......................... 704/275 |
| 6,028,531 A | 2/2000 | Wanderlich |
| 6,028,593 A | 2/2000 | Rosenberg et al. .......... 345/156 |
| 6,071,194 A | 6/2000 | Sanderson et al. ............ 463/37 |
| 6,084,587 A | 7/2000 | Tarr et al. |
| 6,094,565 A | 7/2000 | Alberth et al. |
| 6,125,264 A | 9/2000 | Watanabe et al. |
| 6,125,385 A | 9/2000 | Wies et al. |
| 6,128,006 A | 10/2000 | Rosenberg et al. |
| 6,131,097 A | 10/2000 | Peurach et al. |
| 6,154,201 A | 11/2000 | Levin et al. |
| 6,160,489 A | 12/2000 | Perry et al. |
| 6,161,126 A | 12/2000 | Wies et al. .................. 709/203 |
| 6,169,540 B1 | 1/2001 | Rosenberg et al. .......... 345/326 |
| 6,219,032 B1 | 4/2001 | Rosenberg et al. .......... 345/157 |
| 6,292,174 B1 | 9/2001 | Mallet et al. ................. 345/163 |
| 6,300,936 B1 | 10/2001 | Braun et al. |
| 6,332,075 B1 | 12/2001 | Verdonk |
| 6,337,678 B1 | 1/2002 | Fish ........................... 345/156 |
| 6,359,550 B1 | 3/2002 | Brisebois et al. ......... 340/407.1 |
| 6,411,198 B1 | 6/2002 | Hirai et al. |
| 6,418,323 B1 | 7/2002 | Bright et al. |
| 6,429,846 B2 | 8/2002 | Rosenberg et al. .......... 345/156 |
| 6,435,794 B1 | 8/2002 | Springer ........................ 414/5 |
| 6,438,390 B1 | 8/2002 | Awan |
| 6,438,392 B1 | 8/2002 | Toba |
| 6,441,599 B1 | 8/2002 | Kropidlowski ............... 324/67 |
| 6,606,508 B2 | 8/2003 | Becker et al. |
| 6,626,358 B1 | 9/2003 | Breimesser et al. ......... 235/380 |
| 6,636,197 B1 | 10/2003 | Goldenberg et al. |
| 6,671,618 B2 | 12/2003 | Hoisko |
| 6,690,955 B1 | 2/2004 | Komiyama |
| 6,710,518 B2 | 3/2004 | Morton et al. ............... 310/328 |
| 6,727,916 B1 * | 4/2004 | Ballard ....................... 715/758 |
| 6,792,294 B1 | 9/2004 | Kushita |
| 6,819,922 B1 | 11/2004 | Janz |
| 6,850,150 B1 | 2/2005 | Ronkainen |
| 6,850,781 B2 | 2/2005 | Goto |
| 6,859,819 B1 | 2/2005 | Rosenberg et al. |
| 6,876,847 B2 | 4/2005 | Kudoh |
| 6,882,713 B2 | 4/2005 | Sakai et al. |
| 6,885,876 B2 * | 4/2005 | Aaltonen et al. ......... 455/550.1 |
| 6,940,497 B2 | 9/2005 | Vincent et al. |
| 6,944,482 B2 | 9/2005 | Engstrom et al. |
| 6,963,762 B2 * | 11/2005 | Kaaresoja et al. ........... 455/567 |
| 7,096,045 B2 | 8/2006 | Yoshinaga |
| 7,103,389 B2 | 9/2006 | Shibata |
| 7,127,271 B1 | 10/2006 | Fujisaki |
| 7,148,875 B2 | 12/2006 | Rosenberg et al. |
| 7,162,274 B2 | 1/2007 | Hama et al. |
| 7,171,191 B2 * | 1/2007 | Olson ..................... 455/412.2 |
| 7,225,000 B2 | 5/2007 | Katayanagi |
| 7,289,796 B2 | 10/2007 | Kudoh |
| 7,328,020 B2 | 2/2008 | Masuda et al. |
| 7,336,977 B2 | 2/2008 | Katayanagi |
| 7,369,115 B2 | 5/2008 | Cruz-Hernandez et al. |
| 7,373,120 B2 | 5/2008 | Messel et al. |
| 7,424,272 B2 | 9/2008 | Horiguchi |
| 2001/0035854 A1 | 11/2001 | Rosenberg et al. |
| 2001/0036832 A1 | 11/2001 | McKay ..................... 455/456 |
| 2001/0044328 A1 | 11/2001 | Tsukamoto |
| 2002/0012323 A1 | 1/2002 | Petite et al. |
| 2002/0044155 A1 | 4/2002 | Becker ..................... 345/684 |
| 2002/0111737 A1 | 8/2002 | Hoisko |
| 2002/0130904 A1 | 9/2002 | Becker et al. ............... 345/753 |
| 2002/0194246 A1 | 12/2002 | Moskowitz et al. ......... 709/102 |
| 2003/0002682 A1 | 1/2003 | Smith et al. |
| 2003/0006892 A1 | 1/2003 | Church |
| 2003/0076298 A1 | 4/2003 | Rosenberg |
| 2003/0078071 A1 | 4/2003 | Uchiyama |
| 2003/0174121 A1 | 9/2003 | Poupyrev et al. ............ 345/156 |
| 2004/0059790 A1 * | 3/2004 | Austin-Lane et al. ....... 709/207 |
| 2004/0067780 A1 | 4/2004 | Eiden |
| 2005/0134561 A1 | 6/2005 | Tierling et al. |
| 2006/0248183 A1 | 11/2006 | Barton |

FOREIGN PATENT DOCUMENTS

| | | |
|---|---|---|
| WO | WO 95/20788 A1 | 8/1995 |
| WO | 00/41788 | 7/2000 |
| WO | 02/03172 | 1/2002 |
| WO | 02/059869 | 8/2002 |
| WO | 02/078810 | 10/2002 |
| WO | 2004/052193 | 6/2004 |
| WO | 2004/053644 | 6/2004 |
| WO | 2004/053671 | 6/2004 |
| WO | 2004/053829 | 6/2004 |
| WO | 2004/053830 | 6/2004 |

OTHER PUBLICATIONS

Search Report, International Searching Authority, PCT/US03/38899, Apr. 19, 2004.

Search Report, International Searching Authority, PCT/US03/38961, Apr. 5, 2004.

Search Report, International Searching Authority, PCT/US01/41099, Jan. 2, 2002.

Search Report, International Searching Authority, PCT/US03/38900, Apr. 14, 2004.

Search Report, International Searching Authority, PCT/US03/38868, Sep. 27, 2004.

Erikson, Carl, "Polygonal Simplification: An Overview," Dept. of Computer Science, TR96-016, 1996, pp. 1-32.

Hardman, Lynda et al., "Do You Have the Time? Composition and Linking in Time-based Hypermedia," Proceedings of the 10th ACM Conference on Hypertext and Hypermedia, Feb. 1999, pp. 189-196.

MacLean, Karon E. et al., "An Architecture for Haptic Control of Media," in: The Proceedings of the ASMA Dynamic Syatems and Control Division: 1999 International Mechanical Engineering Congress and Exposition, Eighth Annual Symposium on Haptic Interfaces for Virtual Environment and Teleoperator Systems, Nov. 14-19, 1999, pp. 1-10.

Snibbe, Scott S., "Haptic Techniques for Media Control," In Proceeding of the 14th Annual ACM Symposium on User Interface Software and Technology, 2001, pp. 1-10.

International Search Report and Written Opinion, Application No. PCT/US06/35645, dated Jun. 23, 2008.

* cited by examiner

USING HAPTIC EFFECTS TO ENHANCE INFORMATION CONTENT IN COMMUNICATIONS

CROSS-REFERENCE TO RELATED APPLICATIONS

This application claims priority based upon U.S. Provisional Patent Application Ser. No. 60/431,662, filed on Dec. 8, 2002, the entire disclosure of which is incorporated herein by reference. This application also claims priority under the Patent Cooperation Treaty based upon co-pending PCT application no. PCT/US03/38868 filed Dec. 8, 2003.

FIELD OF THE INVENTION

This invention relates generally to haptic-feedback systems. More specifically, embodiments of the present invention relate to using customized haptic effects in a variety of applications to convey information to users of handheld communication devices.

BACKGROUND

As handheld communication devices become part of everyday life, device manufactures and service providers strive to enhance the versatility and performance of such devices.

Handheld communication devices in the art (e.g., mobile phones, pagers, personal digital assistants (PDAs), etc.) typically use auditory and visual cues to alert a user when incoming messages, such as voice calls and emails, are received. Such auditory and visual alerts, however, have the disadvantages of being distracting in some situations (e.g., during driving), or annoying in others (e.g., during a meeting or a concert). Although vibratory alerts are made available in some communication devices such as cellular phones, such vibratory effects cannot be customized or personalized according to applications, thus conveying little information to the user. A need, therefore, exists in the art for a new sensory modality that delivers information to users of handheld communication devices in a personalized fashion.

SUMMARY

Embodiments of the invention relate to methods and systems for providing customized "haptic messaging" to users of handheld communication devices in a variety of applications.

In one embodiment, a method of haptic messaging includes: receiving an input signal; extracting a haptic code from the input signal, the haptic code being associated with a haptic logo; and providing a control signal to an actuator, the control signal being based at least in part on the haptic code and configured to cause the actuator to output a haptic effect associated with the haptic logo.

In one embodiment, a method of haptic messaging includes: receiving an input signal associated with a chat message; causing an avatar associated with the chat message to be displayed on a handheld communication device; and outputting a control signal to an actuator coupled to the handheld communication device, the control signal being configured to cause the actuator to output a haptic effect associated with the chat message.

Further details and advantages of embodiments of the invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments described in the following description are provided by way of example to illustrate some general principles of the invention, and should not be construed as limiting the scope of the invention in any manner. One skilled in the art would also recognize that various changes and modifications can be made herein, without departing from the principles and scope of the invention.

Figure 1:
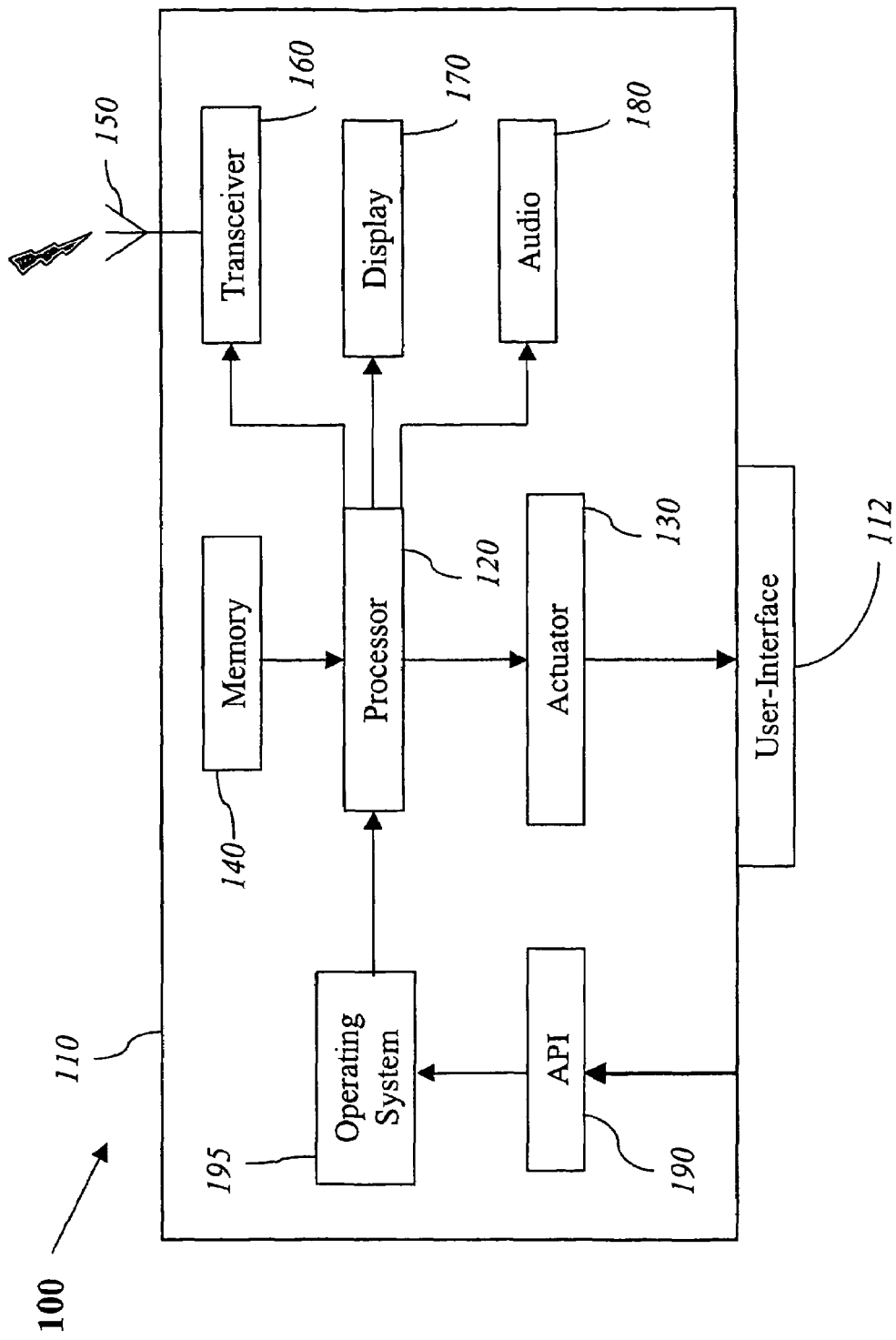
FIG. 1 depicts a block diagram of a haptic handheld communication device according to an embodiment of the present invention.

FIG. 1 depicts a block diagram of a handheld communication device 100 according to an embodiment of the invention. It will be appreciated that various elements are shown in schematic form for illustrative purposes and are not drawn to scale. It will also be appreciated that many alternative ways of practicing the present invention exit. Accordingly, various changes and modifications may be made herein, without departing from the principles and scope of the invention.

Device 100 includes a device body including a housing 110 and a user-interface 112; a processor 120; at least one actuator 130 in communication with processor 120; and a memory 140 in communication with processor 120. Device 100 also includes an antenna 150 and a transceiver 160, in communication with processor 120. Device 100 additionally includes a display module 170 and an audio module 180, in communication with processor 120. Display module 170 may include, for example, a liquid crystal device. Audio means 180 may include, for example, a speaker, a microphone, and the like.

For purpose of illustration in the embodiment of FIG. 1, processor 120, actuator 130, and memory 140 are shown to be enclosed within and coupled to the device body. Such an illustration, however, should not be construed as limiting the scope of the invention in any manner. In alternative embodiments, actuator 130 may, for example, be coupled to the outside of housing 110, or embedded in housing 110 via a suitable mechanism. Further, user-interface 112 may include one or more user-interface members. As used herein, a user-interface member includes, without limitation, a key pad having one or more keys, one or more buttons, a touch screen or touch pad, a scroll wheel, a direction pad, a trackball, a knob, a miniature joystick, or other user-interface means known in the art.

Device 100 further includes an API (Application Program Interface) 190, working in conjunction with an operating system 195. A device driver (not shown) may optionally provide an interface between operating system 195 and processor 120.

Memory 140 of device 100 stores a program code that includes instructions to cause processor 120 to perform various tasks. The following description provides some examples.

Figure 2:
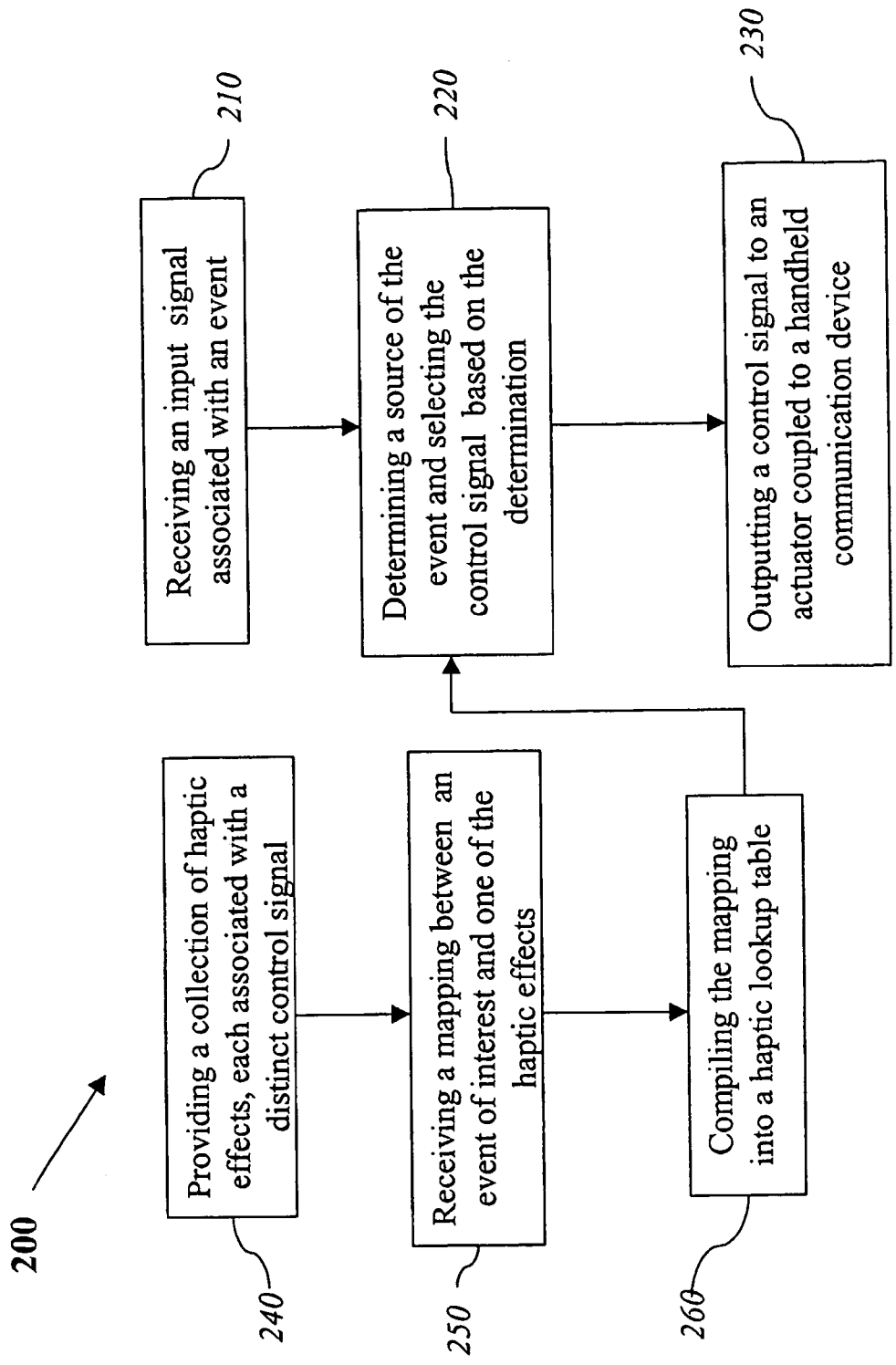
FIG. 2 shows a flowchart depicting a method of using customized haptic effects to convey information to users of handheld communication devices, according to an embodiment of the invention.

FIG. 2 shows a flowchart 200 depicting a method of using customized haptic effects to convey information to users of handheld communication devices, according to an embodiment of the invention. At step 210, an input signal associated with an event is received. At step 220, a source of the event is determined and a control signal is selected based on the determination. At step 230, a control signal is output to an actuator coupled to a handheld communication device (see FIG. 1 for an embodiment of such device). The control signal is configured to cause the actuator to output a haptic effect associated with the event.

Furthermore at step 240, a collection of haptic effects is provided, each haptic effect being associated with a control signal. For example, memory 140 of FIG. 1 can store a program code that includes instructions to generate the control signals (e.g., each characterized by a distinct waveform) for rendering the corresponding haptic effects. Haptic effects (along with associated control signals) may also be downloaded or transmitted from a remote source, such as a service provider, a network resource, a Web server, a remote handheld communication device or computer. Such downloaded or transmitted haptic effects can be further edited or modified. At step 250, a mapping between an event of interest and one of the stored haptic effects is received. By way of example, memory 140 of FIG. 1 may also store a program code that enables a user to map an event of interest to one of the haptic effects as provided, e.g., via user-interface 112 through API 190, where the event may be identified by its source. At step 260, the one-to-one mappings made between various events of interest and the corresponding haptic effects are compiled into a haptic lookup table, which can, for example, be stored in memory 140 of FIG. 1.

In the embodiment of FIG. 2, the term "selecting" includes, without limitation, looking up a predetermined mapping between the event of interest and a corresponding haptic effect based on the source determination, and selecting/generating a control signal that is configured to render the desired haptic effect associated with the event (e.g., upon being applied to an actuator). Selection can be made based upon the aforementioned haptic lookup table, for example.

In one embodiment, the input signal may include a communication signal associated with a call event, such as a voice call, an e-mail, or a message in text or multimedia form, which may be received via antenna 150 and transceiver 160 of FIG. 1, for example. The "source" of a call event may be related to a characteristic that distinctly identifies or characterizes the call event, such as the caller's phone number, the sender's e-mail address, a graphical feature or an icon associated with the incoming message, etc.

In another embodiment, the input signal may be associated with a reminder event, which may be a self-generated message on the handheld communication device serving as a reminder for a pre-scheduled activity (e.g., an appointment or a meeting). The source in this scenario may be associated with the type of a pre-scheduled activity (e.g., a business meeting vs. a restaurant reservation), or the time at which the pre-scheduled activity takes place.

In yet another embodiment, the input signal may include a communication signal associated with a status event, for example, received via antenna 150 and transceiver 160 of FIG. 1. Examples of a status event include, but are not limited to: an advertisement (e.g., sale) event, a one-to-one marketing event, a business-transaction event, a stock-trading event, a weather-forecast event, a sports (or game) event, an entertainment event, and an emergency (e.g., 911) event. In this scenario, the source may be associated with a characteristic that distinctly identifies the sender and/or the nature of a status event, such as the phone number of the handheld user's stock broker, the e-mail address of the user's favorite store, the logo associated with the user's favorite TV or radio station, and so on.

In one embodiment, an event of interest can be accompanied by a distinct haptic effect, or overlapping haptic effects, conveying to the user customized information such as "who is calling," "what is happening," and so on. The user can also be allowed to update the haptic lookup table, e.g., to include new events, and/or to modify the mappings between the existing events of interest and the corresponding haptic effects.

Moreover, a specific haptic effect can be assigned to any incoming signal event whose source is unknown, so as to alert the user that the incoming message is from an un-identifiable or sender.

As used herein, the term "handheld communication device" includes, without limitation, a mobile phone such as a cellular phone or a satellite phone, a personal digital assistant (PDA), a cordless telephone, a pager, a two-way radio, a handheld or portable computer, a game console controller, a personal gaming device, an MP3 player, or other personal electronic devices known in the art that are equipped with communication or networking capabilities.

In one embodiment, the aforementioned haptic effects can be used as haptic ringers (e.g., counterparts to auditory ring tones) that are customized or personalized to convey information to the user about various events of interest. By way of example, a haptic ringer associated with a call from a loved one (e.g., the user's spouse) may comprise low-amplitude and high frequency vibrations that impart gentle sensations to the user. In contrast, a haptic ringer associated with an emergency event (such as a 911-call) may comprise jolt-like pulses that impart pounding sensations to the user.

In contrast with conventional auditory ring tones, the aforementioned haptic effects (e.g., haptic ringers) are more desirable in an environment where extraneous auditory signals are prohibited (e.g., during a meeting or a concert), and/or where it is difficult to distinguish auditory signals (e.g., in a loud environment such as an airport). The haptic ringers are also more suitable in distracting situations such as driving, so that the user of a handheld communication device can keep eyes on the road without having to look at the device. Moreover, such haptic ringers convey customized information to the user, so that the user is aware of "who is calling," "what is happening," and so on, as the following examples further illustrate.

A handheld communication device such as a mobile phone may be configured to allow a user to include haptic information or a haptic code in an outgoing communication signal, e.g., carrying a voice call, an e-mail, or a message. The encoding of a communication signal with haptic information may be based on an established scheme or protocol, and/or on a per-system basis. The haptic code is configured to cause a haptic effect to be output when the communication signal is delivered to another handheld communication device. In one embodiment, businesses and organizations may each be associated with a distinct haptic logo (e.g., a particular vibration pattern) and include their haptic logos in various messages sent to the handheld communication devices of their customers. Such haptic logos can serve as counterparts to conventional logos known in the art, for example. Various status events mentioned above may also be transmitted in this manner. By way of example, a merchant may include its haptic logo in various advertisement events and business transaction events to be transmitted to the handheld communication devices of its customers. Stock brokers (or brokerage firms), TV or radio stations, and marketing/advertising agencies may likewise include their haptic logos in various stock-trading events, weather-forecast events, sports events, entertainment events, and one-to-one marketing events to be transmitted to the handheld users.

Figure 3:
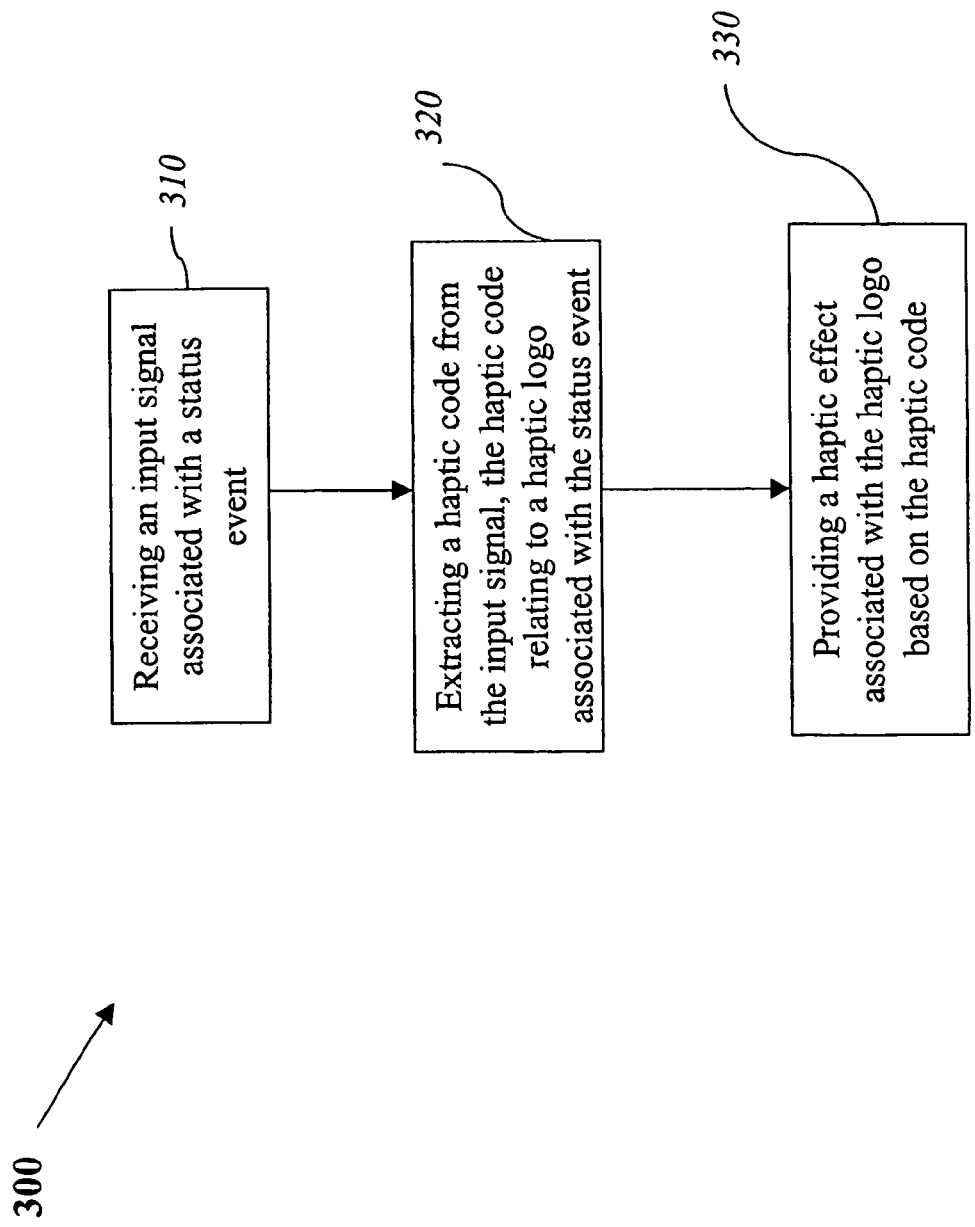
FIG. 3 shows a flowchart depicting a method of using haptic logos to relate information to users of handheld communication devices, according to an embodiment of the invention.

FIG. 3 shows a flowchart 300 depicting a method of using haptic logos to relate information to users of handheld communication devices, according to an embodiment of the invention. A handheld communication device receives an input signal at step 310, the input signal being associated with a status event. The handheld communication device extracts a haptic code from the input signal at step 320, where the haptic code is associated with a haptic logo. At step 330, the handheld communication device provides a haptic effect associated with the haptic logo. Step 330 may include providing a control signal to an actuator coupled to the handheld communication device, where the control signal is based at least in part on the haptic code and configured to cause the actuator to output the haptic effect.

In one embodiment, the extracted haptic code may be directly applied to the actuator for rendering the desired haptic effect. In another embodiment, the haptic code may be configured according to a predetermined scheme or protocol that includes, for example, a table of haptic codes (some of which may be associated with one or more haptic logos) versus control signals for rendering the corresponding haptic effects. In this way, a processor in the handheld communication device can look up the corresponding control signal from the table based on the extracted haptic code, and output the selected control signal to the actuator for rendering the desired haptic effect.

In the embodiments of FIG. 2 or 3, the handheld communication device (or the haptic code) may be programmed such that the haptic effect is output immediately, or at a prescribed time after receiving the input signal, as desired in applications. The haptic effects can also be triggered by, or synchronized with, other occurrences.

A handheld communication device may be further configured such that some of its user-interface members (such as those described above) are each associated with a haptic code, e.g., according to a predetermined scheme or protocol. In one embodiment, some of these haptic codes may be associated with haptic effects that emulate expressions or behaviors, such as "laugh," "giggle," "hug," "high-five," "heartbeat," "pet purring," etc. This allows haptic effects to be transmitted and experienced, e.g., in an interactive conversation or a chat session, by pressing or manipulating such members.

By way of example, suppose that user A (termed "Alice" herein) is engaged in a chat session with user B (termed "Bob" herein) via their respective mobile phones. In one embodiment, when Bob tells Alice a joke, Alice can respond by sending a "laugh" sensation to Bob, e.g., by pressing a key on her mobile phone that is assigned with a haptic code corresponding to a laugh sensation. This causes a signal to be transmitted from Alice's phone to Bob's phone, and a corresponding haptic effect to be output to Bob's phone (and thereby experienced by Bob). In alternative embodiments, Alice can include a haptic code in an outgoing message (which may also contain a video image such as a picture taken by her mobile phone, and/or a graphical feature such as an emoticon emulating a smiley face) to be transmitted to Bob, e.g., by pressing the corresponding user-interface member. The haptic code causes a haptic effect to be output when the message is delivered to a remote device such as Bob's mobile phone. In one embodiment, the haptic effect may be correlated or synchronized with the displaying of a video image contained in the message. In another embodiment, the generation of the haptic effect based on the haptic code may be carried out in a manner similar to that described above with respect to the embodiment of FIG. 3.

Figure 4:
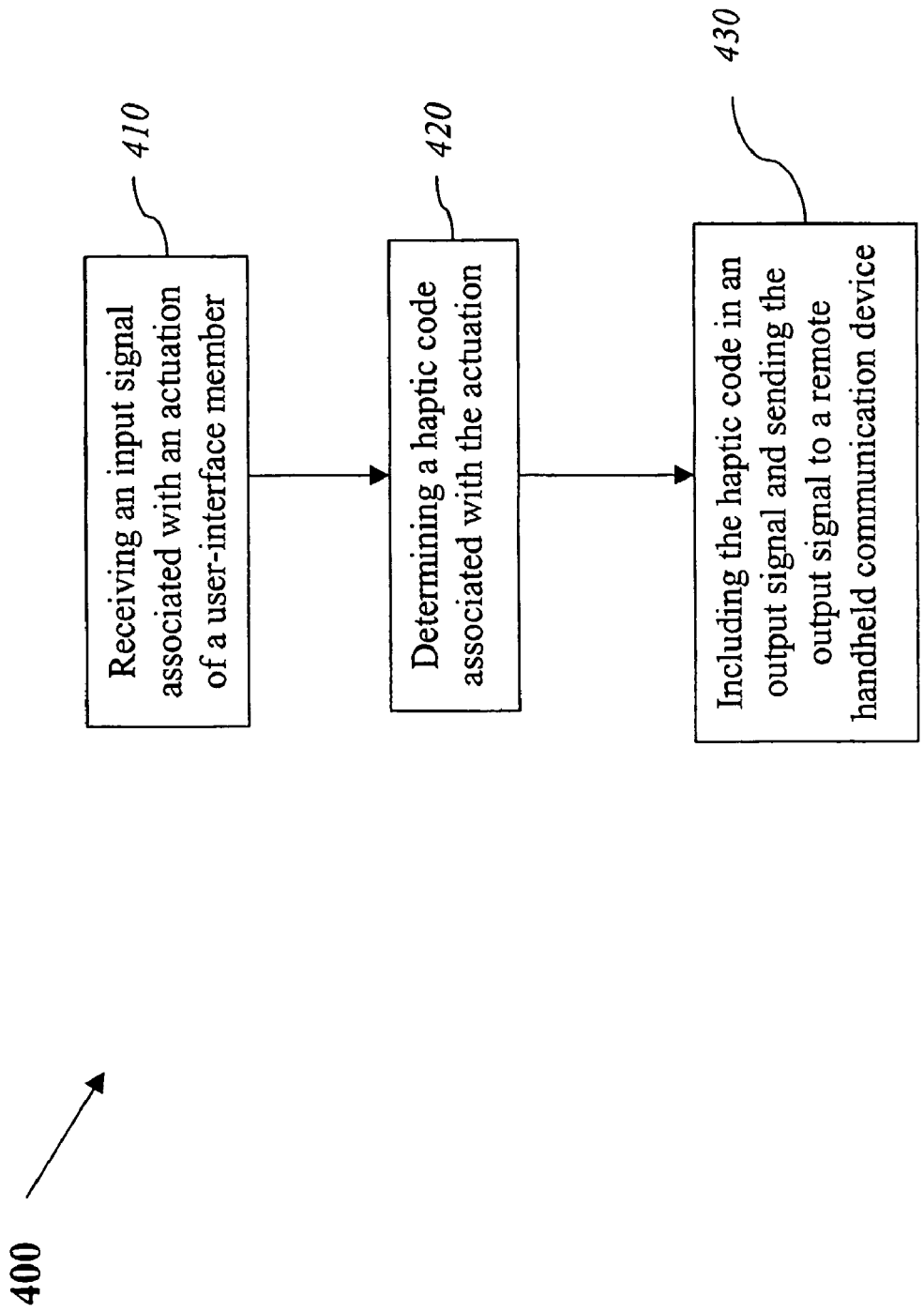
FIG. 4 shows a flowchart depicting a method of haptically encoding communication signals, according to an embodiment of the invention.

FIG. 4 depicts a flowchart 400 illustrating a method of a method of haptically encoding communication signals, according to an embodiment of the invention. At step 410, an input signal associated with an actuation of a user-interface member is received. By way of example, the input signal may be associated with Alice's pressing or manipulating a particular user-interface member. At step 420, a haptic code associated with the actuation is determined. At step 430, the haptic code is included in an output signal, and the output signal is sent to a remote handheld communication device. As described above, the output signal may also include a message, a video image, and/or a graphical feature.

Figure 5:
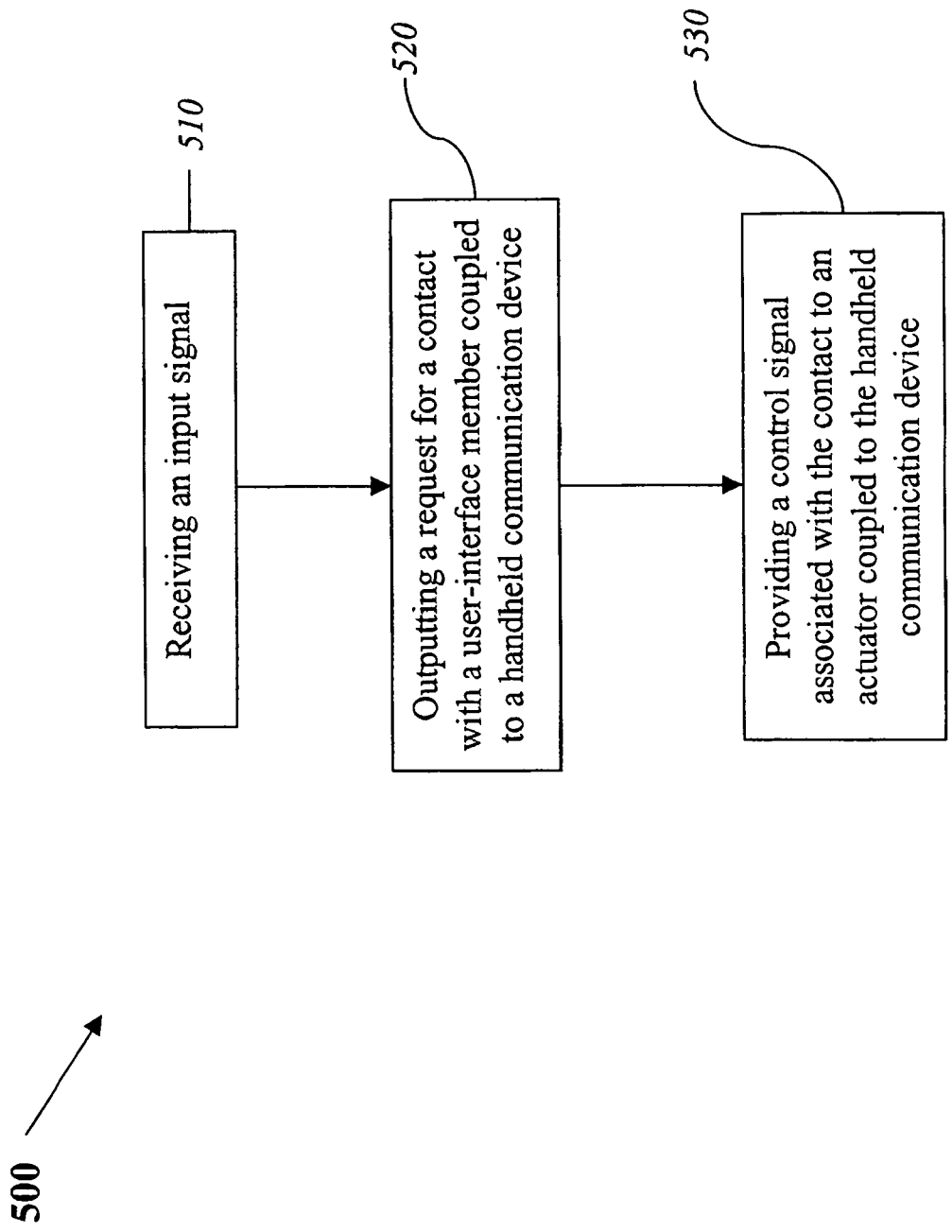
FIG. 5 shows a flowchart depicting a method of providing haptic messaging to users of handheld communication devices, according to a further embodiment of the invention.

A handheld communication device may also be configured such that a haptic effect, along with a message, is output upon a contact with a user-interface member being made (e.g., by a user or an input device). FIG. 5 depicts a flowchart 500 illustrating a method of haptic message that can be associated with this situation, according to an embodiment of the invention. At step 510 of the flowchart 500, a handheld communication device receives an input signal. At step 520, the handheld communication device outputs a request for a contact with a user-interface member coupled to the handheld communication device. At step 530, the handheld communication device provides a control signal associated with the contact to an actuator coupled to the handheld communication device. The control signal is configured to cause the actuator to output a haptic effect associated with the input signal. Step 520 may include having a visual effect displayed, an auditory effect played, and/or a distinctive haptic ringer output, which requests a contact with the user-interface member being made.

In one embodiment, the input signal in FIG. 5 may include a haptic code, along with a message, a video image, and/or a graphical feature, etc. For example, the haptic code may be configured to cause a "hug" sensation to be output when the video image contained in the input signal is displayed. The input signal may also contain a provision or protocol that specifies that the incoming message along with the corresponding haptic effect is output upon a contact with a particular user-interface member (e.g., the #5 key) being made. Alternatively, the handheld communication device may determine the user-interface member to be contacted, before outputting incoming message along with the corresponding haptic effect.

In another embodiment, the input signal of FIG. 5 may be associated with a "virtual touch," e.g., to mimic a handshake, a "high-five," a pat on the back, a pulse or heartbeat sensation, a pet purring sensation, or other touch sensations associated with human (and/or human-animal) interactions. In one scenario, the input signal at step 510 may include a "virtual touch indicator," based on which the request for a contact with a particular user-interface member is made. The virtual touch indicator may be in the form of a haptic code, a message, or other informative means. The control signal at step 530 may be generated, e.g., based on the virtual touch indicator, a haptic code associated with the user-interface member at play, or other predetermined scheme. The input signal at step 510 may also include a virtual touch indicator along with a virtual touch signal for rendering the desired haptic effect. In this case, the control signal at step 530 may be based on the virtual touch signal.

Referring back to the chat session between Alice and Bob, by way of example at the end of their chat session, Alice may wish to send Bob a "high-five." She sends to Bob's mobile phone a signal including a virtual touch indicator, which in turn prompts a request that Bob be in contact with a user-interface member coupled to his phone, such as a direction pad (e.g., by putting his fingers on the individual keys of the direction pad), a key pad, a touch screen, a trackball, a joystick, or the like. The control signal for rendering a haptic effect that emulates a "high-five" may be based on the haptic code associated with the user-interface member, transmitted with the input signal from Alice, and/or other predetermined scheme.

Figure 6:
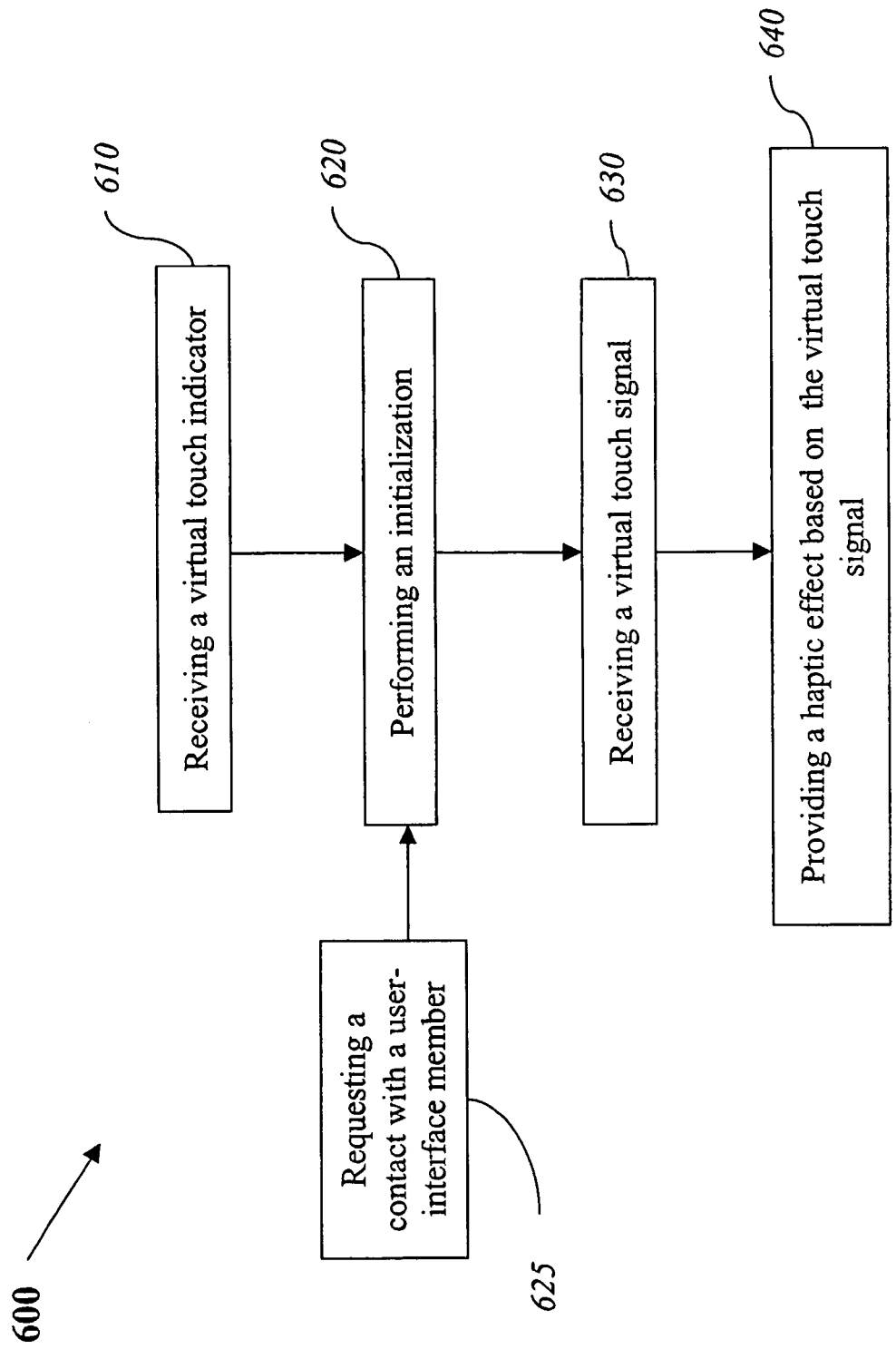
FIG. 6 shows a flowchart illustrating a method of providing an interactive virtual touch in one embodiment of the present invention.

Interactive virtual touch can also be engaged between users of handheld communication devices, where the manipulation of a user-interface member on one handheld communication device is transmitted possibly in substantially real-time to another handheld device and experienced by its user, and vice versa. FIG. 6 depicts a flowchart 600 illustrating a method of providing interactive virtual touch in one embodiment of the present invention. In the embodiment shown, a handheld communication device first receives an input signal including a virtual touch indicator at step 610. A distinctive haptic ringer may, for example, accompany the arrival of the virtual touch indicator, identifying the sender and the nature of the input signal. The handheld communication device may then perform any necessary initialization to enable the communication at step 620, which may also include requesting a contact with a particular user-interface member coupled to the handheld communication device at step 625. The handheld communication device subsequently receives a virtual touch signal in the communication associated with the desired haptic effect at step 630. The handheld communication device provides the haptic effect at step 640, e.g., by applying the virtual touch signal to an actuator coupled to the user-interface member.

In one embodiment, the virtual touch signal may be associated with the manipulation of a user-interface member on a remote handheld device and transmitted in substantially real-time. And the user on the receiving end may respond by acting in a similar fashion, so as to emulate an interactive touch. Any schemes for delivering virtual touch to users of handheld communication devices may be used.

Figure 7:
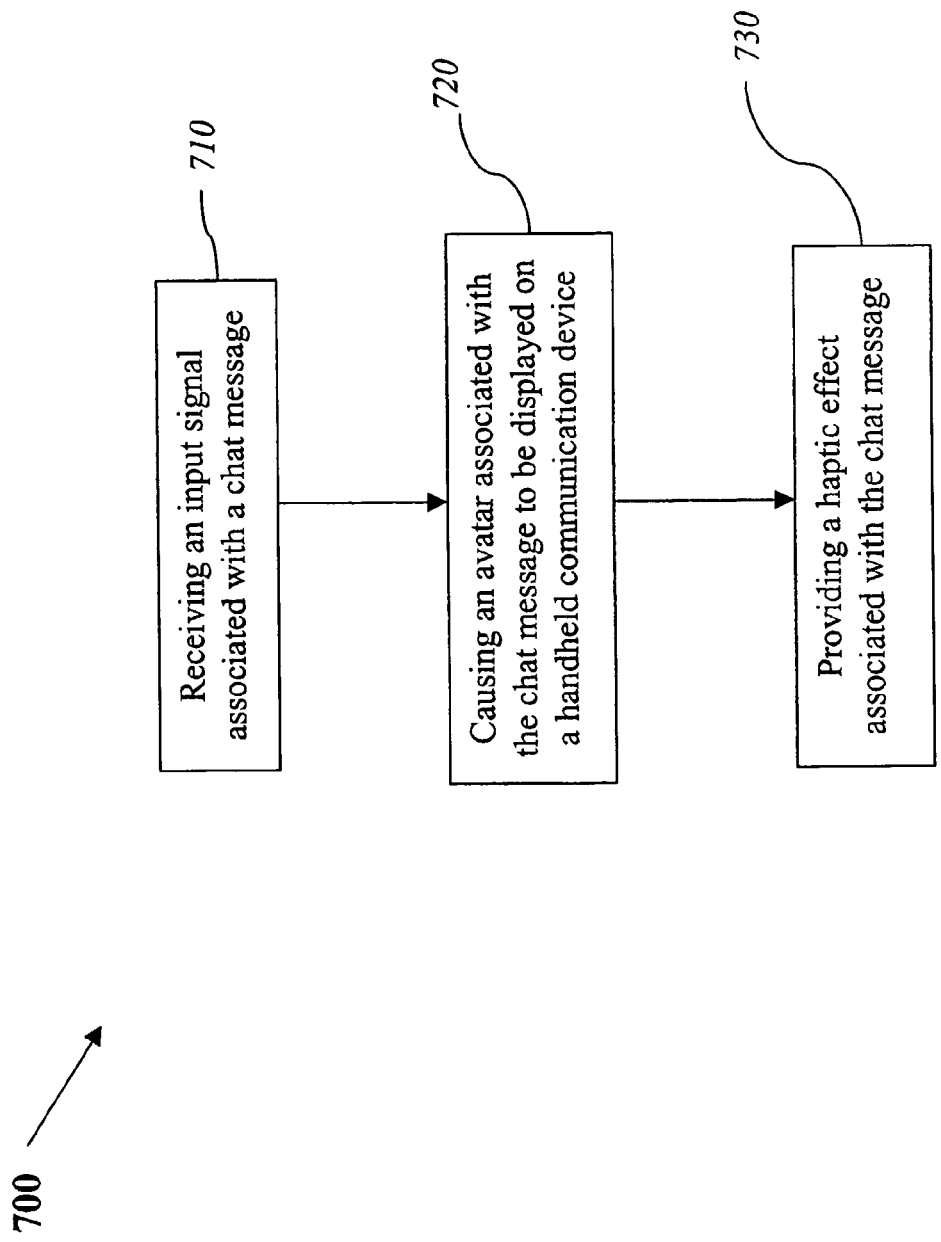
FIG. 7 depicts a flowchart illustrating a method of carrying out a chat session using handheld communication devices, according to an embodiment of the invention.

Haptic effects can also be used to enhance and complement the information content communicated between handheld communication devices. In one embodiment, a plurality of handheld communication users may be engaged in a chat session via their handheld communication devices. The users may each have a graphical representation or avatar displayed on other handheld communication devices. Such avatars can also be haptically enabled, for example, whereby their expressions and/or behaviors are accompanied and enhanced by corresponding haptic effects. FIG. 7 is a flowchart 700 depicting a method of carrying out a chat session using handheld communication devices, according to an embodiment of the invention. In the embodiment shown, a handheld communication device receives an input signal associated with a chat message at step 710. The handheld communication device displays an avatar associated with the chat message at step 720. The avatar may be shown on display 170 of FIG. 1, in one embodiment. At step 730, the handheld communication device provides a haptic effect associated with the chat message. Step 730 may include outputting a control signal to an actuator coupled to the handheld communication device, where the control signal is configured to cause the actuator to output the haptic effect. In one embodiment, the haptic effect may be correlated with an expression or behavior of the avatar, such as a laugh or giggle, a cry, a pet purring, or the like.

Figure 8:
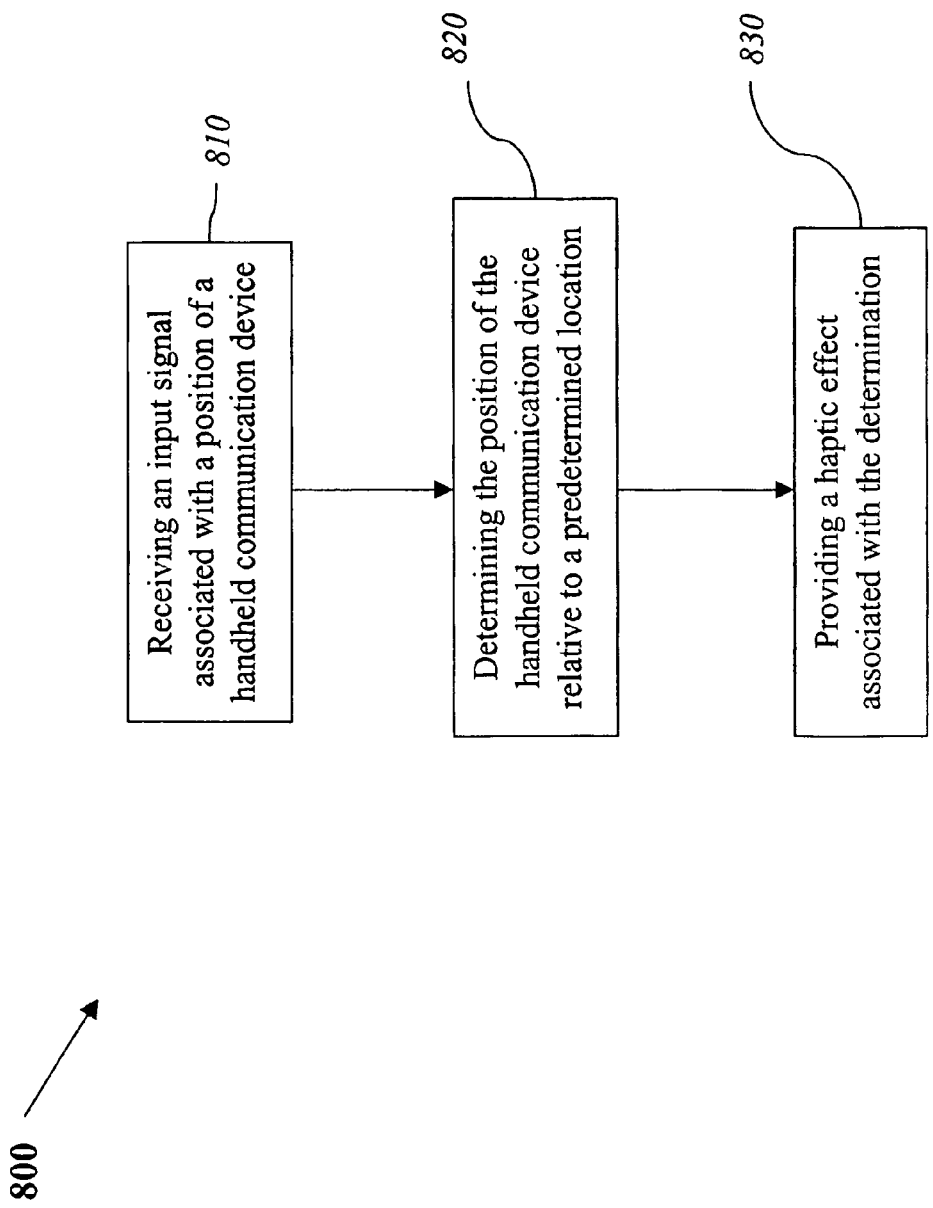
FIG. 8 shows a flowchart depicting a method of using haptic effects to relate navigation information, according to an embodiment of the invention.

Handheld communication devices are increasingly equipped with navigation capability, for example, in communication with the Global Position System (GPS) or other navigation systems. Haptic effects can also be used to convey navigation information, such as positional and/or directional information, to handheld users. By way of example, FIG. 8 shows a flowchart 800 depicting a method of haptic navigation, according to an embodiment of the present invention. The flowchart 800 discloses receiving an input signal associated with a position of a handheld communication device at step 810; determining the position of a handheld communication device relative to a predetermined location at step 820; and providing a haptic effect associated with the determination at step 830. Step 830 may include outputting a control signal associated with the determination to an actuator coupled to the handheld communication device, the control signal being configured to cause the actuator to output the haptic effect. Further, the input signal at step 810 may be received from GPS, a digital compass, or other navigation systems known in the art.

In one embodiment, the haptic effect may be associated with a distance between the position of the handheld communication device and a predetermined location (termed "destination" herein). For example, the haptic effect may include a vibration having a magnitude and a frequency, where at least one of the magnitude and the frequency decreases as the distance from the destination diminishes. Additionally, the haptic effect may be configured to convey a quantitative measure of the distance. By way of example, the haptic effect may include one or more pulse or jolt sensations, where the number of pulses is proportional to the number of miles between the position of the handheld device and the destination.

Processors described above (including processor 120 of FIG. 1) can include, for example, one or more digital logical processors capable of processing input, execute algorithms, and generate output as necessary to perform various tasks, such as those described above. Such processors/controllers may include a microprocessor, an Application Specific Integrated Circuit (ASIC), and state machines. Such processors include, or may be in communication with, media (including memory 140 of FIG. 1). Such media include, for example, computer readable media, which stores program code that, when executed by a processor, cause the processor to perform the steps described herein. Embodiments of computer-readable media include, but are not limited to, an electronic, optical, magnetic, or other storage or transmission device capable of providing a processor, such as the processor in a web server, with computer-readable instructions. Other examples of suitable media include, but are not limited to, a floppy disk, CD-ROM, magnetic disk, memory chip), ROM, RAM, ASIC, configured processor, all optical media, all magnetic tape or other magnetic media, or any other medium from which a computer processor can read. Also, various other forms of computer-readable media may transmit or carry instructions to a computer, including a router, private or public network, or other transmission device or channel.

Program code and associated application programs related to various applications may also reside on a remote source, such as a network resource, a Web server, a remote handheld communication device or computer, which can be transmitted or downloaded to a handheld communication device on a regular or predetermined basis. Haptic effects (along with associated control signals) can also be downloaded or transmitted from a remote source, as described above.

Actuators described above (including actuator 130 shown in FIG. 1) can include, for example, a pager motor, an eccentric rotating motor, a harmonic eccentric rotating motor, a voice coil, a solenoid, a resistive actuator, a piezoelectric actuator, an electro-active polymer actuator, or other types of active/passive actuators suitable for generating haptic effects. U.S. Pat. Nos. 6,429,846 and 6,424,333 disclose further details relating to some of these actuators, both of which are incorporated in full herein by reference. In some embodiments, one or more actuators may be implemented in a handheld communication device, configured to deliver appropriate haptic effects. It will be appreciated that various control schemes can be devised accordingly, for controlling the actuator(s) in a manner that best achieves the desired haptic effects.

Referring back to FIG. 1. In one embodiment, actuator 130 may be coupled to housing 110, thereby imparting haptic effects thus generated to the device body. Haptic ringers (or alerts) described above may be delivered in this manner, for instance. In another embodiment, actuator 130 may be coupled to user-interface 112 of the device body. For instance, an active and/or resistive actuator can be coupled to user-interface 112 to deliver a virtual touch described above. One or more actuators can also be coupled to user-interface 112, for example, to convey a virtual touch such to a user. In yet another embodiment, a plurality of actuators can be coupled to housing 110 as well as user-interface 112. In addition, one or more actuators may also be coupled to a headset, a wristband, or other accessory means associated with a handheld communication device.

Embodiments of the invention include the following.

In one embodiment, an individual (or "Bob") can have a mobile phone according to the invention. The mobile phone also has an e-mail capability, for example, including both "receive" and "send"). The mobile phone is configured to provide a plurality of haptic effects, e.g., by including appropriate hardware (such as actuators described above) and program code. Bob can program the mobile phone, for example, via user-interface 112 through API 150 shown in FIG. 1, by inputting various events of interest and associating each with a distinct haptic effect. Thus, when an event of interest is subsequently received, the mobile phone provides the corresponding haptic effect.

In one embodiment, Bob's phone includes programming that provides a first haptic effect when an input signal is received from the mobile phone of Bob's wife (or "Alice"). Bob's phone also includes programming that provides a second haptic effect that is different and distinct from the first haptic effect, when an input signal is received from the mobile phone of Bob's supervisor at work (termed "Carol" herein). Bob's phone is further be configured to provide a third haptic effect that is different from the two mentioned above, e.g., when an e-mail is received from the e-mail address of Bob's stock broker (where the e-mail mail contains a "smiley-face" emoticon, for instance). The third haptic effect can be a vibration with high magnitude and short duration, e.g., to emulate a "high-five."

In another embodiment, Bob can be watching a movie in a theater with his mobile phone in his pocket. It is set to make no noise, because Bob is in a theater. While Bob is watching the movie, Bob's mobile phone vibrates with the second haptic effect mentioned above. Bob chooses to ignore the call, because he does not wish to speak with his supervisor at a movie theater. Later, Bob's mobile phone vibrates with the first haptic effect. Bob wants to speak with Alice, for example, to make plans to meet later. So Bob answers the phone and quickly exits the theater to talk with Alice.

Bob's mobile phone can also include a personal schedule/calendar application. After speaking with Alice, Bob can enter an entry in the calendar at the 7:00 PM time mark—"Meet Alice". Bob can also choose a fourth haptic effect to associate with the calendar entry. The mobile phone can be programmed to output the fourth haptic effect fifteen minutes before the time entry of the calendar (i.e., at 6:45 PM).

Bob's mobile phone can be equipped with GPS capability, along with an associated application program for location determination. Bob can also store addresses of various locations of interest in the application program. In one embodiment, Bob can be on the road. Bob's mobile phone vibrates with a distinct fifth haptic effect. Bob recognizes the fifth haptic effect being associated with the haptic logo of his favorite electronics store. He then checks with the application program, and receives a sixth haptic effect associated with the distance between his current position and the store location. Bob then decides to make a stop at the store.

A haptically-enabled handheld communication device of the invention may be further used as a two-way haptic remote control, for example, for controlling a remote system such as a Television set or a multimedia system. In one embodiment, the events as referred to above may be related to program channels shown on the remote system, each identified by a channel number (which may be used as the "source"), for instance. The corresponding haptic effects may be customized on a per-channel basis. Such haptic effects can serve to inform a user as to which channel is on, as a user is channel-surfing by way of this haptic remote control, so that the user need not to look up the display screen.

Figure 9:
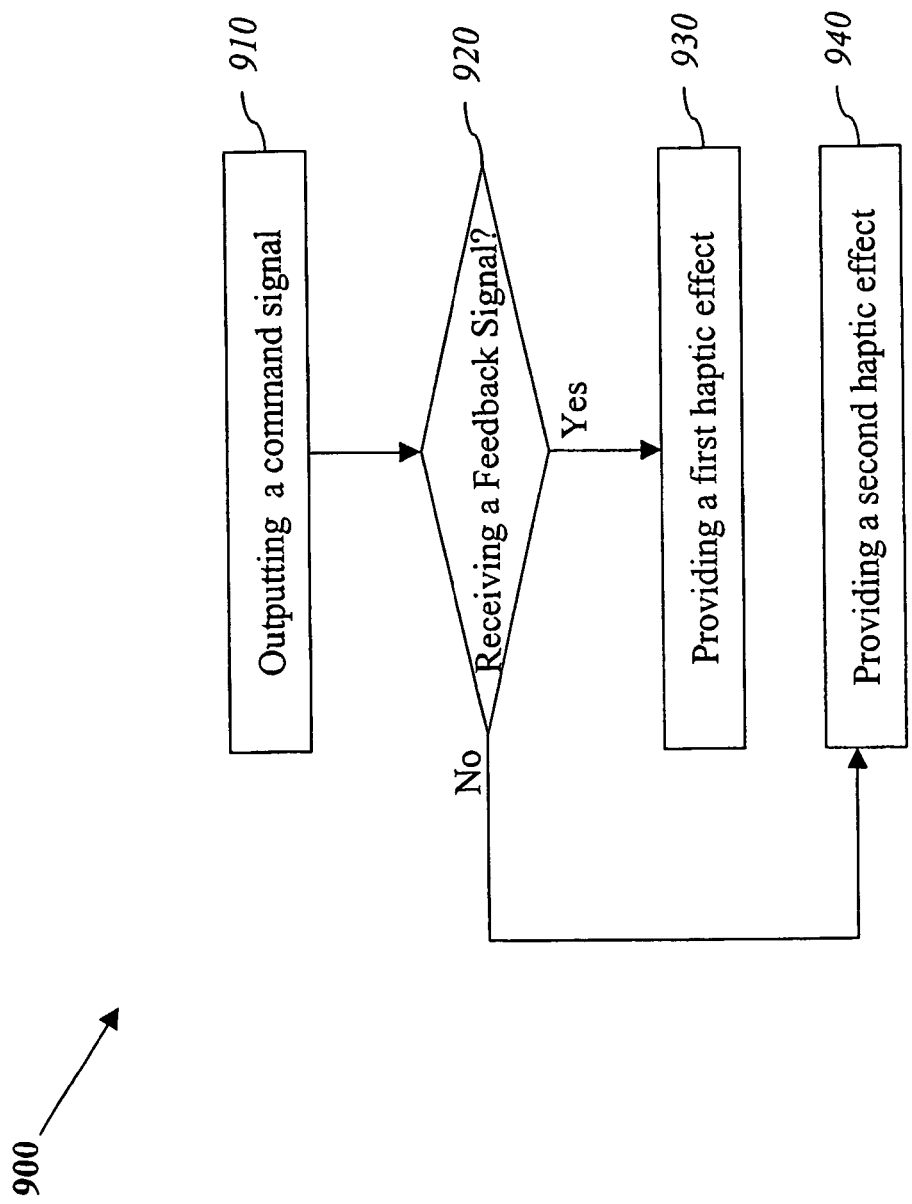
FIG. 9 shows a flowchart illustrating a method for providing haptic effects to a remote control in one embodiment of the present invention.

FIG. 9 depicts a flowchart illustrating a method for providing haptic effects to a remote control in one embodiment of the present invention. In the embodiment shown, the remote control sends a command signal to a remote system at step 910. As with a conventional remote control, the signal may or may not reach the television. The remote control then determines whether a feedback signal has been received at step 920. If the remote control receives a feedback signal, the remote control provides a first haptic effect at step 930. If not, the remote control provides a second haptic effect at step 940.

The first haptic effect can be further customized according to the received feedback signal. In one embodiment, the remote system provides information (e.g., via the feedback signal) to the remote control regarding the state of the display, e.g., based on a predetermined scheme. The remote control may use the information to determine a corresponding haptic effect to provide at step 930. In alternative embodiments, the remote system may determine the appropriate haptic effect to provide and include a corresponding haptic code in the feedback signal. The remote control provides the haptic effect at step 930 based on this haptic code.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed is:

1. A method, comprising:
   receiving an input signal sent from calling or sending party, wherein the input signal includes a haptic code therein;
   extracting the haptic code from the input signal, the haptic code being associated with a haptic logo which distinctly corresponds to the calling or sending party; and
   providing a control signal to an actuator, the control signal being based at least in part on the haptic code and configured to be directly applied to the actuator to cause the actuator to output a haptic effect associated with the haptic logo, wherein the haptic effect identifies the calling or sending party of the input signal.

2. The method of claim 1 wherein the haptic logo is associated with a status event.

3. The method of claim 2 wherein the status event includes one of an advertisement event, a business-transaction event, a one-to-one marketing event, a stock-trading event, a weather-forecast event, an entertainment event, a sports event, and an emergency event.

4. The method of claim 1 wherein the haptic effect is output to a handheld communication device.

5. The method of claim 4, further comprising:
   receiving a second input signal that indicates a distance between the calling or sending party and the handheld communication device; and
   causing the actuator to output a second haptic effect based on the second input signal.

6. A computer-readable storage medium on which is encoded instructions to be executed by a processor, said instructions when executed configuring the processor to:
   receive an input signal, wherein the input signal is sent from a calling or sending party and includes a haptic code therein;
   extract the haptic code from the input signal, the haptic code being associated with a haptic logo distinctly corresponding to the calling or sending party; and
   provide a control signal to an actuator, the control signal being based at least in part on the haptic code and configured to directly apply the haptic code to the actuator to cause the actuator to output a haptic effect associated with the haptic logo, wherein the haptic effect identifies the calling or sending party of the input signal.

7. The computer-readable medium of claim 6 wherein the haptic logo is associated with a status event.

8. The computer-readable medium of claim 7 wherein the status event includes one of an advertisement event, a business-transaction event, a one-to-one marketing event, a stock-trading event, a weather-forecast event, an entertainment event, a sports event, and an emergency event.

9. The computer-readable medium of claim 6 wherein the haptic effect is output to a handheld communication device.

10. An apparatus, comprising:
    a processor;
    an actuator in communication with the processor; and
    a memory in communication with the processor, the memory storing program code executable by the processor, the processor configured to:
    receive an input signal, wherein the input signal is sent from a calling or sending party and having a haptic code therein;
    extract the haptic code from the input signal, the haptic code being associated with a haptic logo distinctly corresponding to the calling or sending party; and
    provide a control signal to the actuator, the control signal being based at least in part on the haptic code and configured to directly apply the haptic code to the actuator to cause the actuator to output a haptic effect associated with the haptic logo, wherein the haptic effect identifies the calling or sending party of the input signal.

11. The apparatus of claim 10 wherein the actuator is coupled to a handheld communication device.

12. The apparatus of claim 11 wherein the handheld communication device includes one of a cellular phone, a satellite phone, a cordless phone, a personal digital assistant, a pager, a two-way radio, a portable computer, a game console controller, a personal gaming device, and an MP3 player.

13. The apparatus of claim 10 wherein the haptic logo is associated with a status event.

14. The apparatus of claim 13 wherein the status event includes one of an advertisement event, a business-transaction event, a one-to-one marketing event, a stock-trading event, a weather-forecast event, an entertainment event, a sports event, and an emergency event.

15. The apparatus of claim 10 wherein the memory further stores a haptic lookup table associating a plurality of haptic codes each with a control signal.

16. The apparatus of claim 15 wherein the memory further stores program code to download the haptic lookup table from a remote source.

17. A mobile device comprising:
    means for receiving an input signal sent from a calling or sending party;
    means for extracting a haptic code from the input signal, the haptic code being associated with a haptic logo which distinctly corresponds to the calling or sending party; and
    means for directly applying the haptic code to an actuator for outputting a haptic effect associated with the haptic logo, wherein the haptic effect identifies the calling or sending party of the input signal.

18. A method, comprising:
    receiving a first input signal at a communication device;
    extracting a haptic code from the first input signal at the communication device, the haptic code being associated with a haptic logo distinctly corresponding to the calling or sending party, wherein the haptic code causes an actuator of the communication device to output a first haptic effect associated with the haptic logo, wherein the first haptic effect identifies the calling or sending party of the input signal;
    receiving a second input signal at the communication device, wherein the second input signal indicates a distance between the calling or sending party and the communication device; and
    causing the actuator to output a second haptic effect based on the second input signal.

* * * * *